United States Patent [19]

Friedmann

[11] Patent Number: 5,156,249

[45] Date of Patent: * Oct. 20, 1992

[54] TORQUE TRANSMITTING APPARATUS WITH AXIALLY DEFORMABLE PRIMARY FLYWHEEL

[75] Inventor: Oswald Friedmann, Lichtenau, Fed. Rep. of Germany

[73] Assignee: Luk Lamellen Und Kupplungsbau Gmbh, Bühl, Fed. Rep. of Germany

[*] Notice: The portion of the term of this patent subsequent to Oct. 20, 2009 has been disclaimed.

[21] Appl. No.: 708,937

[22] Filed: May 31, 1991

[30] Foreign Application Priority Data

| May 31, 1990 | [DE] | Fed. Rep. of Germany | 4017519 |
| Jun. 29, 1990 | [DE] | Fed. Rep. of Germany | 4020759 |
| Aug. 31, 1990 | [DE] | Fed. Rep. of Germany | 4027542 |
| Aug. 31, 1990 | [DE] | Fed. Rep. of Germany | 4027593 |
| Aug. 31, 1990 | [DE] | Fed. Rep. of Germany | 4027614 |
| Aug. 31, 1990 | [DE] | Fed. Rep. of Germany | 4027629 |
| Dec. 24, 1990 | [DE] | Fed. Rep. of Germany | 4041709 |
| Dec. 24, 1990 | [DE] | Fed. Rep. of Germany | 4041722 |

[51] Int. Cl.⁵ ............................ F16D 3/66; F16D 3/14
[52] U.S. Cl. ............................ 192/106.2; 192/70.17; 464/68; 74/574
[58] Field of Search ............... 192/70.17, 106.2; 464/66, 68; 74/574

[56] References Cited

U.S. PATENT DOCUMENTS

| 4,555,009 | 11/1985 | Habel et al. | 192/70.17 X |
| 4,809,830 | 3/1989 | Schierling et al. | 464/68 X |
| 4,978,324 | 12/1990 | Casse | 464/68 |
| 5,042,632 | 8/1991 | Jäckel | 192/106.1 X |

FOREIGN PATENT DOCUMENTS

| 0147136 | 7/1985 | Fed. Rep. of Germany | 464/68 |
| 3607751 | 9/1987 | Fed. Rep. of Germany | 464/68 |
| 3721706 | 1/1988 | Fed. Rep. of Germany | . |
| 3732818 | 4/1988 | Fed. Rep. of Germany | 464/68 |
| 3902110 | 7/1990 | Fed. Rep. of Germany | 192/106.1 |
| 2066415 | 7/1981 | United Kingdom | 464/68 |
| 2098702 | 11/1982 | United Kingdom | 464/68 |
| 2180322 | 3/1987 | United Kingdom | 464/68 |

Primary Examiner—Leslie A. Braun
Assistant Examiner—Andrea Pitts
Attorney, Agent, or Firm—Peter K. Kontler

[57] ABSTRACT

An apparatus for transmission of torque between the crankshaft of an engine and the input shaft of a variable-speed transmission in a motor vehicle has a primary flywheel with a membrane which is connectable to the crankshaft, a secondary flywheel which is connectable to the input shaft by way of a friction clutch, a damper with circumferentially acting coil springs in an annular chamber of the first flywheel radially outwardly of the membrane, and torque transmitting arms which are carried by the second flywheel and alternate with the coil springs of the damper. A slip clutch can be installed between the torque transmitting arms and the second flywheel to limit the magnitude of transmittable torque.

21 Claims, 4 Drawing Sheets

TORQUE TRANSMITTING APPARATUS WITH AXIALLY DEFORMABLE PRIMARY FLYWHEEL

BACKGROUND OF THE INVENTION

The invention relates to improvements in apparatus for transmission of torque in motor vehicles. More particularly, the invention relates to improvements in apparatus for transmission of torque between the engine and the variable-speed transmission in a motor vehicle Published German patent application No. 37 21 706 of Wolfgang Reik (published Jan. 7, 1988) discloses a torque transmitting apparatus wherein a primary flywheel is connectable with the output element of the engine in a motor vehicle and a secondary flywheel is connectable with the input element of the variable-speed transmission by engaging a friction clutch. A bearing is interposed between the two flywheels, and the primary flywheel can transmit torque to the secondary flywheel by way of a damper having circumferentially acting energy storing elements which are installed in a toroidal chamber of the primary flywheel.

Torque transmitting apparatus of the above outlined character are popular in many types of motor vehicles. At the present time, such apparatus have found acceptance in relatively large motor vehicles with longitudinally extending engine-transmission aggregates and with considerable amount of space for installation of a rather bulky torque transmitting apparatus having a composite flywheel between the engine and the transmission. However, and even though they exhibit numerous desirable features which would render them equally useful in compact vehicles with little room under the hood, the aforedescribed apparatus are not used in smaller vehicles, particularly in vehicles with transversely extending engines and transmissions, because presently known apparatus are too bulky for installation in compact cars and in other conveyances wherein the space between the engine and the transmission is at a premium. Accordingly, there exists an urgent need to provide a torque transmitting apparatus which employs a composite flywheel and is sufficiently compact and inexpensive to be capable of being out to use in smaller cars including those wherein the engine-transmission aggregate does not extend in the direction of forward movement of the vehicle.

OBJECTS OF THE INVENTION

An object of the invention is to provide a torque transmitting apparatus which employs a composite flywheel and is sufficiently compact and inexpensive to be capable of being put to use in vehicles which cannot be equipped with presently known twin-flywheel torque transmitting apparatus.

Another object of the invention is to provide a torque transmitting apparatus which constitutes an improvement over and a further development of apparatus of the type disclosed in published German patent application No. 37 21 706.

A further object of the invention is to provide novel and improved flywheels for use in the above outlined apparatus.

An additional object of the invention is to provide the apparatus with novel and improved means for transmitting torque between the flywheels.

Still another object of the invention is to provide the apparatus with novel and improved means for determining the magnitude of maximum permissible torque which can be transmitted between the flywheels.

A further object of the invention is to provide an apparatus which renders it possible to achieve optimal torque transmission and damping rates.

Another object of the invention is to provide a novel and improved power train which can be used in motor vehicles and embodies the above outlined torque transmitting apparatus.

An additional object of the invention is to provide a torque transmitting apparatus which is assembled of a small number of simple and inexpensive parts.

A further object of the invention is to provide a novel and improved method of assembling the constituents of the above outlined torque transmitting apparatus.

Another object of the invention is to provide an apparatus which is adequately shielded from fluctuations of transmitted torque as well as from axially oriented stray movements of the engine and/or transmission.

A further object of the invention is to provide a novel and improved mode of mounting the primary flywheel of the torque transmitting apparatus on the engine of a motor vehicle.

SUMMARY OF THE INVENTION

One feature of the present invention resides in the provision of a torque transmitting apparatus for use in a motor vehicle. The apparatus comprises a first flywheel which is rotatable about a predetermined axis and includes a membrane having a first portion adjacent the axis and connectable with a rotary output element of an engine in the motor vehicle. The first flywheel further comprises a toroidal portion defining an annular chamber which is spaced apart from and surrounds the axis of the first flywheel, and the membrane further includes a second portion which surrounds the first portion and is connected with the toroidal portion of the first flywheel The apparatus further comprises a second flywheel which is coaxial with and is rotatable relative to the first flywheel and can be connected with an input element of a transmission in the motor vehicle by a clutch, at least one antifriction bearing between the flywheels, and at least one damper which is operative to oppose rotation of the flywheels relative to each other and has energy storing elements installed in the annular chamber and acting in the circumferential direction of the flywheels.

The toroidal portion of the first flywheel can be assembled of two substantially bowl-shaped components which can be welded to each other. One of these components is adjacent the engine when the first flywheel is connected to the engine, and the second portion of the membrane is preferably connected to the one component.

The first portion of the membrane can be offset relative to the second portion in the axial direction of the first flywheel. The two portions of the membrane can resemble washers, and the second portion is preferably nearer to the engine when the first flywheel is connected to the engine.

The first flywheel can be provided with an axial extension in the form of a sleeve or ring at the first portion of the membrane, and the at least one bearing is preferably installed between the extension and the second flywheel. A washer can be positioned adjacent the extension, and the first portion of the membrane can be clamped between the washer and the extension. The extension is preferably located at that side of the membrane which faces the second flywheel.

The apparatus further comprises means for transmitting torque between the at least one damper and the second flywheel, and such torque transmitting means comprises portions (e.g., in the form of substantially radially outwardly extending arms) which are supported by the second flywheel and extend into the annular space between the energy storing elements of the damper. Means can be provided for fixedly securing the torque transmitting means to the second flywheel. Alternatively, the apparatus can comprise a second damper which is interposed between the torque transmitting means and the second flywheel. Such second damper can comprise or constitute a slip clutch. For example, the second damper can be of the type known as torsionally elastic damper and can comprise one or more springs, e.g., a diaphragm spring.

The second damper can constitute a means for limiting the magnitude of torque which can be transmitted by the torque transmitting means before the first flywheel is free to rotate relative to the second flywheel. The slip clutch which forms part of or constitutes the torque limiting means is preferably installed close to and radially inwardly of the energy storing elements in the annular chamber for the at least one damper. Furthermore, the slip clutch of the torque limiting means is preferably located radially outwardly of an annular frictional surface which is provided on the second flywheel to be engaged by a friction lining on the clutch plate of the clutch which must be engaged in order to transmit torque between the second flywheel and the input element of the variable-speed transmission.

The damper of the torque limiting means can be installed between the membrane and the second flywheel.

The membrane can further serve to bias the operative position a seal which is interposed between the two flywheels, particularly to seal the annular chamber from the atmosphere so that a supply of viscous fluid (such as oil or grease) can remain confined in the annular chamber for extended periods of time.

The membrane can be installed in such condition that it is stressed in the axial direction of the first flywheel, and such membrane can be maintained in direct or indirect frictional engagement with the second flywheel.

The first flywheel can comprise an elastic membrane which stresses the second flywheel in the axial direction.

The at least one bearing can be provided with means for taking up the axial stress of the membrane.

Another feature of the invention resides in the provision of a torque transmitting apparatus which comprises a first rotary flywheel connectable with the engine of a motor vehicle, a second flywheel which is coaxial with and is rotatable relative to the first flywheel and is connectable with the transmission of the motor vehicle, at least one damper which is operative to oppose rotation of the flywheels relative to each other and includes energy storing elements acting in the circumferential direction of the flywheels, means for transmitting torque from the at least one damper to the second flywheel, and means for limiting the magnitude of torque which is transmitted by the torque transmitting means. Such limiting means comprises a slip clutch which is adjacent to and is disposed radially inwardly of the energy storing elements.

The novel features which are considered as characteristic of the invention are set forth in particular in the appended claims. The improved torque transmitting apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
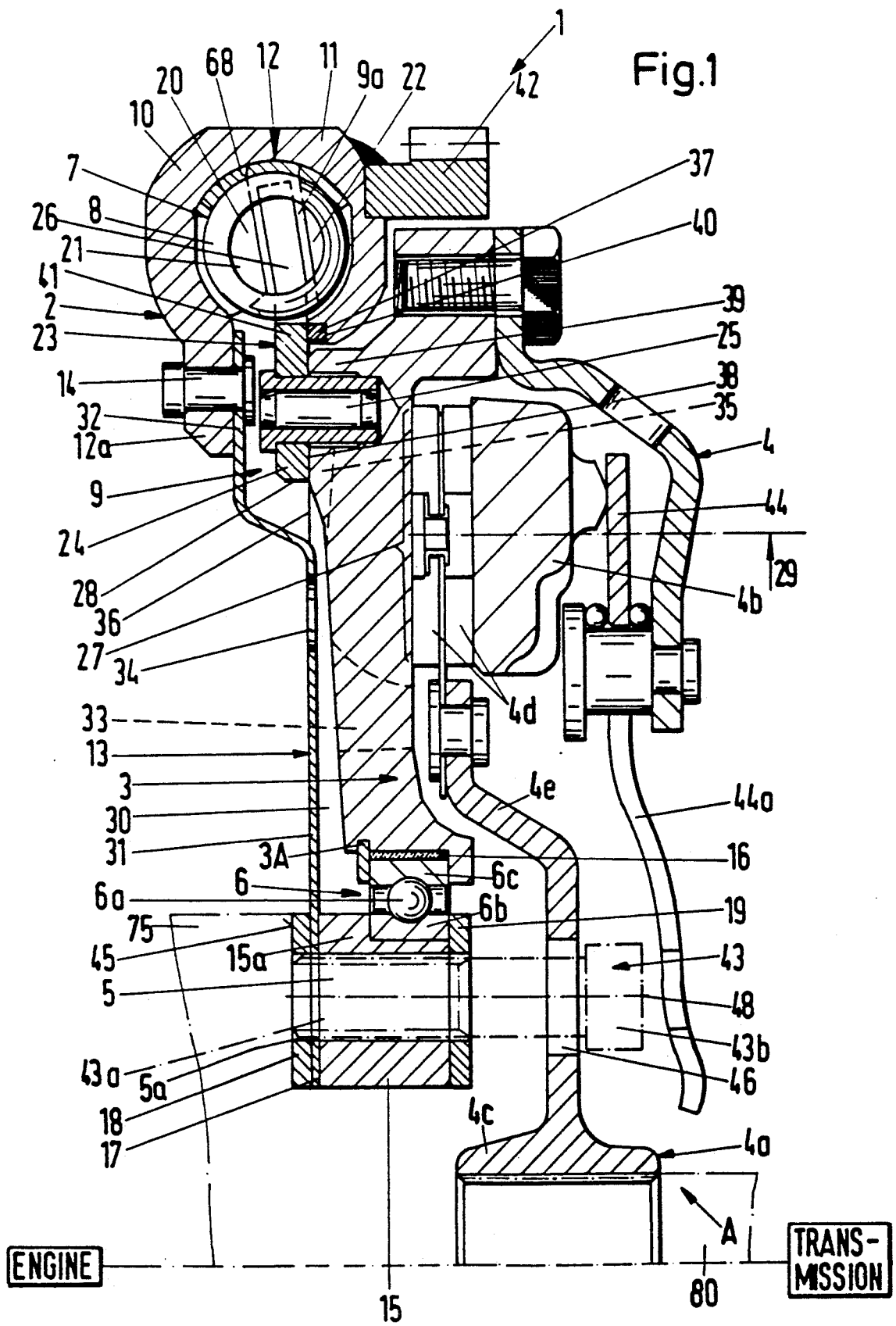
FIG. 1 is a fragmentary axial sectional view of a torque transmitting apparatus which embodies one form of the invention.

Referring first to FIG. 1, there is shown a portion of a torque transmitting apparatus 1 which can be installed between the rotary output element 75 (such as a crankshaft) of an internal combustion engine and the rotary input element 80 of a variable-speed transmission of a motor vehicle. The apparatus 1 comprises a first or primary flywheel 2 which is connectable to the output element 75 by fasteners 43 (e.g., in the form of allen screws), and a second or secondary flywheel 3 which is coaxial with and is rotatable relative to the primary flywheel and can be connected to the input element 80 by way of a friction clutch 4. The latter comprises a clutch plate 4a having a hub 4c which can be non-rotatably slipped onto the input element 80. An antifriction bearing 6, having a single row of spherical rolling elements 6a, is installed between the flywheels 2, 3 and a damper 7 is provided to oppose rotation of the flywheels relative to each other as well as to drive torque transmitting means 23 supported by the secondary flywheel 3 and cooperating with the circumferentially acting energy storing elements 8 of the damper. The energy storing elements 8 of the illustrated damper 7 are arcuate coil springs.

The bearing 6 is installed radially outwardly of holes 5 which are provided in the primary flywheel 2 to receive the externally threaded shanks 43a of the fasteners 43.

The energy storing elements 8 of the damper 7 are confined in the toroidal radially outermost portion 9a of an annular chamber 9 which is defined by two substantially mirror symmetrical components 10, 11 of the primary flywheel 2 radially outwardly of the bearing 6 and holes 7. The chamber 9 is at least partially filled with a viscous fluid, such as oil or grease, which lubricates the energy storing elements 8, the internal surfaces of the components 10, 11 and the portions or arms 26 of the torque transmitting means 23. The internal surfaces of the components 10, 11 rather closely follow the outlines of the adjacent radially outer portions of energy storing elements 8. These components are made of metallic sheet material and are welded to each other by a circumferentially extending seam or joint 12 disposed in a plane which coincides with or is closely adjacent the plane including the axes of the energy storing elements 8.

The primary flywheel 2 further comprises an axially deformable membrane 13 having a radially outer portion 32 which is secured to the radially inner portion 12a of the component 10 by a set of rivets 14. The component 10 has a substantially C-shaped or semicircular cross-sectional outline and is adjacent the engine (which is assumed to be located to the left of FIG. 1) when the primary flywheel 2 is properly connected to the output element 75. A radially inner portion 31 of the membrane 13 is clamped between a washer-like member 18 and a tubular extension 15 of the primary flywheel 2 by rivets (not shown) or in any other suitable way. The extension 15 is disposed at that side of the membrane 13 which faces toward the secondary flywheel 3 and this extension is surrounded by the bearing 6 which, in turn, is surrounded by the radially innermost portion of the secondary flywheel 3. A thermal insulator or barrier 16 (e.g., a sleeve of heat-resistant plastic material having a low thermal conductivity) is interposed between the outer race of the bearing 6 and the adjacent portion of the flywheel 3. The washer 18 cooperates with the extension 15 to clamp the radially innermost part 17 of inner portion 31 of the membrane 13. The latter is dished in that the portion 31 is offset relative to the portion 32 in the axial direction of the flywheels 2 and 3. The arrangement is such that the radially outer portion 32 is nearer to the engine than the radially inner portion 31.

A retaining washer 19 is provided at the inner axial end of the extension 15 to maintain the inner race of the bearing 6 in a desired axial position. This washer 19 can be fixed to the extension 15 by the aforementioned rivets which connect the extension with the washer 18 and cause the radially innermost part 17 of the membrane 13 to be reliably clamped between 15 and 18.

The component 11 of the toroidal radially outermost portion of the primary flywheel 2 has a substantially C-shaped or semicircular cross-sectional outline and is adjacent the right-hand halves of energy storing elements 8 in the toroidal portion 9a of the chamber 11. The toroidal portion 9a is subdivided into arcuate compartments 20, one for each of the energy storing elements 8. The ends of neighboring compartments 20 are separated from each other by partitions each of which includes a depression 21 in the component 10 and a depression 22 in the component 11. These depressions develop as a result of impression of pockets into the external surfaces of the components 10 and 11. Each depression 21 is adjacent a depression 22, and such pairs of depressions normally flank the aforementioned portions or arms 26 of the torque transmitting means 23 on the secondary flywheel 3 when the apparatus 1 is idle, i.e., when the engine including the output element 75 does not rotate the primary flywheel 2. Each compartment 20 includes a first half between two neighboring depressions 21 of the component 10 and a second half between two neighboring depressions 22 of the component 11.

The torque transmitting means 23 comprises a circumferentially complete annular portion 24 which is fixedly secured to the radially outer portion of the secondary flywheel 3 by blind rivets 25. The portions or arms 26 are integral with the circumferentially complete portion 24 and extend substantially radially outwardly into the toroidal portion 9a of the chamber 9 to alternate with the energy storing elements 8 of the damper 7. It is equally possible to replace the circumferentially complete portion 24 with a set of elongated bases or feet each of which is integral with a radially outwardly extending arm 26 and which are individually fixed to the secondary flywheel 3 by pairs of rivets or the like. Reference may be had to commonly owned copending patent application Ser. No. 07/708,930 filed May 31, 1991.

The right-hand side of the secondary flywheel 3 includes an annular friction surface 27 which is engaged by the adjacent friction lining 4d on the radially outwardly extending flange 4e of the clutch plate 4a when the friction clutch 4 is engaged to transmit torque from the secondary flywheel 3 to the input element 80 of the variable-speed transmission. The torque transmitting means 23 is preferably mounted in such a way that at least 50% of the friction surface 27 (as measured from the radially outermost portion to the radially innermost portion of the friction surface) is located radially inwardly of the circle defined by the radially innermost portion 28 of the torque transmitting means 23. In other words, the torque transmitting means 23 does not extend radially inwardly beyond a circle having a diameter 29 corresponding to the diameter of a circle defined by the median portion of the annular friction surface 27. The just described mode of mounting the torque transmitting means 25 is desirable and advantageous because this renders it possible to locate the blind rivets 25 at a considerable radial distance from the axis of the flywheel 3. Moreover, this renders it possible to have the radially inner portion of the annular chamber 9 extend radially inwardly toward but not beyond the circle having the diameter 29. Consequently, the radially inner portion 31 of the membrane 13 and the adjacent portion of the secondary flywheel 3 can define a relatively large clearance 30 which extends from the extension 15 and all the way to a seal 36 between such clearance and the radially inner portion of the chamber 9.

The feature that the central portion of the secondary flywheel 3 can extend all the way to the membrane 13 of the primary flywheel 2 renders it possible to greatly reduce the dimensions of the torque transmitting apparatus 1 in the axial direction of the two flywheels. As shown in FIG. 1, the friction surface 27 of the secondary flywheel 3 can be located close to or even in the space which is surrounded by the toroidal portion 9a of the chamber 9. Such pronounced compactness of the apparatus 1 is particularly important when the apparatus is to be used in smaller motor vehicles including those with transversely extending engine-transmission aggregates.

It is presently preferred to select the positions of the membrane 13 and secondary flywheel 3 in such a way that the width of the clearance 30 is between 0.5 and 6 mm. Furthermore, at least 50% of the clearance (as measured radially of the flywheel 3 and of the membrane 13) preferably should have a width of 1 to 3 mm.

The thickness of the membrane 13 can but need not be uniform and is preferably a fraction of the thickness of the component 10 or 11 of the toroidal radially outer portion of the primary flywheel 2. For example, the thickness of the membrane 13 can be in the range of 0.5 to 3 mm, preferably between about 0.7 and 1.5 mm. The thickness of the blanks of which the components 10, 11 are made in a sheet metal working machine can be in the range of 4 to 8 mm. The width of the radially outer portion 32 of the membrane 13 (as measured in the radial direction of the primary flywheel 2) is preferably less than the width of the radially inner portion 31. The radially outer portion 32 extends radially outwardly to and even beyond the blind rivets 25 for the torque transmitting means 23.

The relatively large clearance 30 serves to facilitate pronounced cooling of the secondary flywheel 3 and of adjacent parts of the apparatus 1. The means for admitting cool atmospheric air into the clearance 30 includes substantially axially parallel openings 33 which are provided in the secondary flywheel 3 radially inwardly of the friction surface 27 and cause the inflowing air streams to impinge upon the inner portion 31 of the membrane 13 in a region radially inwardly of openings 34 which are provided in the inner portion 31 to direct some air toward the engine or to admit air into the clearance 30 if the openings 33 are omitted Atmospheric air which is admitted via openings 34 and/or 33 is caused to leave the radially outermost portion of the clearance 30 by way of radially outwardly extending channels 35 which are machined into or are otherwise formed in the left-hand side of the secondary flywheel 3 between the blind rivets 25 for the circumferentially complete portion 24 of the torque transmitting means 23. The illustrated channels 35 are grooves which are provided in the left-hand side of the flywheel 3 and extend axially toward the bearing 6 as well as radially outwardly to admit air streams into a radially outwardly extending gap between the component 11 of the primary flywheel 2 and the radially outermost portion of the secondary flywheel 3.

The openings 33 and/or 34 can resemble elongated slots which extend in the circumferential direction of the flywheels. In order to enhance the flow of air into and in the clearance 30, the openings 33 and/or 34 can be shaped to resemble vanes or blades of blowers or other fluid circulating apparatus. The configuration of the channels 35 can also be selected in such a way that they enhance the flow of air from the clearance 30; for example, the channels 35 can be dimensioned in such a way that at least some thereof extend a long way in the circumferential direction of the secondary flywheel 3.

The aforementioned seal 36 is interposed between the radially inner portion of the chamber 9 and the radially outer portion of the clearance 30. A second or outer seal 37 is installed between the component 11 and the circumferentially complete portion 24 of the torque transmitting means 23 radially outwardly of the seal 36. These seals prevent the escape of viscous fluid from the chamber 9. The seat 36 is a membrane and its radially inner portion bears against the membrane 13 at or close to the junction of the portions 31 and 32. The circular radially outer portion 38 of the seal 36 is clamped between the portion 24 of the torque transmitting means 23 and the adjacent platforms 39 of the secondary flywheel 3. The platforms 39 alternate with the channels 35 in the circumferential direction of the flywheel 3. The seal 37 can constitute a ring of suitable synthetic plastic material and is installed in a circular groove in the left-hand side of the component 11 radially inwardly of the energy storing elements 8. It is presently preferred to make the ring-shaped seal 37 of a temperature-resistant material, such as polyamidide or TEFLON (Trademark). The circumferentially extending portion 24 of the torque transmitting means 23 has a radially outermost part 41 which is adjacent and is sealingly engaged by the seal 37 in the groove 40 of the component 11. The part 41 projects radially outwardly beyond the platforms 39 of the secondary flywheel 3. The seal 37 can be caused to sealingly engage the part 41 due to axial stressing of the component 11 by the axially stressed membrane 13, i.e., the membrane 13 is stressed to pull the component 11 in a direction to the left whereby the component 11 urges the seal 37 against the radially outermost part 41 of circumferentially complete portion 24 of the torque transmitting means 23 which is fixedly connected to the secondary flywheel 3 by the blind rivets 25. Such axial stressing of the membrane 13 can be effected during assembly of the composite flywheel including the flywheels 2 and 3. The stressing involves imparting to the membrane 13 a tendency to move the components 10 and 11 axially and away from the secondary flywheel 3. In addition to or in lieu of such axial stressing of the membrane 13, the components 10, 11 can be biased axially and away from the secondary flywheel 3 (in order to urge the seal 37 in the groove 40 against the radially outermost part 41) by the prestressed seal 36 which then urges the adjacent portion of the membrane 13 to the whereby the membrane 13 pulls the components 10, 11 away from the radially outermost portion of the flywheel 3. To this end, the seal 36 can include or constitute an elastic membrane or a diaphragm spring. Axial stresses which are caused to develop in order to maintain the seal 37 in adequate engagement with the adjacent part 41 of the torque transmitting means 23 are taken up and counteracted by the antifriction bearing 6. Thus, the retaining washer 19 bears against the inner race 6b of the bearing 6 to urge this inner race against a shoulder 15a of the extension 15, and the inner race 6b causes the rolling elements 6a to tend to move the outer race 6c against a split ring 3A in an internal groove of the secondary flywheel 3.

As a result of biasing of the seal 37 against the radially outermost part 41 (which is affixed to the secondary flywheel 3 by the blind rivets 25), the seal 37 is held in frictional engagement with the portion 41 and constitutes a portion of a damper which operates in parallel with the damper 7 in the toroidal portion 9a of the annular chamber 9. At the same time, the seal 37 serves as an axial guide for the primary flywheel 2 relative to the secondary flywheel 3.

As mentioned above, it is preferred to provide a relatively large clearance 30 which extends all the way from the extension 15 to the seal 36 to thus permit pronounced cooling of the flywheel 3 and of the adjacent parts. The clearance 30 is established directly between the membrane 13 of the primary flywheel 2 and the adjacent major portion of the secondary flywheel 3 at that side of the secondary flywheel which faces away from the friction surface 27 and friction clutch 4. It is particularly important to ensure adequate cooling of the secondary flywheel 3 so that the latter cannot transmit excessive quantities of friction-generated heat to the contents of the chamber 9 and/or to the membrane 13 and/or to the friction clutch 4.

The thermal barrier 16 prevents overheating of the antifriction bearing 6. One or more additional thermal barriers can be interposed between the secondary flywheel 3 and the primary flywheel 2 and its chamber 9. For example, a thermal barrier including an insert of temperature-resistant synthetic plastic material having a low thermal conductivity can be installed between the torque transmitting means 23 and the adjacent portion of the secondary flywheel 3. Alternatively, at least the radially outer portion 38 of the radially inner seal 36 can be made of a material which enables the portion 38 to act as a thermal barrier.

The component 11 of the toroidal radially outer portion 10+11 of the primary flywheel 2 carries a ring-shaped starter gear 42 which is fixedly secured thereto by a welded joint adjacent the radially outermost part of the component 11. The properly secured gear 42 surrounds the radially outermost portion of the secondary flywheel 3 adjacent the left-hand side of the component 11.

The flywheels 2, 3, the bearing 6 and the clutch 4 (including the clutch plate 4a)) are assembled into a unit A which can be conveniently manipulated for delivery to storage, during transport to an automobile assembling plant or to a repair shop, as well as during attachment of the extension 15 (which is provided with the holes 7) to the output element 75 of the engine. The preassembled unit A preferably further includes a requisite number of fasteners 43 which are held captive between the extension 15 and the prongs 44a of a diaphragm spring 44 which biases an axially movable pressure plate 4b of the clutch 4 against the adjacent friction lining 4d when the clutch is engaged. The holes 5 of the extension 15 can contain elastic sleeves 5a which serve to maintain the shanks 43a of the fasteners 43 in such axial positions that the shanks do not project beyond the exposed outer or left-hand side 45 of the washer 18. This simplifies the installation of preassembled unit A on the output element 75 of the engine. The prongs 44a of the diaphragm spring 44 prevent the heads 43b of the fasteners 43 from leaving the internal space of the friction clutch 4. In order to afford access to the polygonal (normally hexagonal) sockets in the heads 43b of captive fasteners 43, the prongs 44a and/or the slots between such prongs are provided with or constitute openings 48 which are dimensioned and/or configurated in such a way that they do not permit passage of the heads 43b. However, such openings 48 are sufficiently large to permit introduction of the working end of a torque transmitting tool (e.g., an allen wrench, not shown) toward and into engagement with the adjacent heads 43b. The tool then moves the adjacent fastener 43 axially to shift the corresponding shank 43a in the elastic sleeve 7a so that the shank 43a can be driven into the registering tapped bore of the output element 75.

The flange 4e of the clutch plate 4a is also provided with openings 46 which are in at least partial alignment with the openings 48 and are dimensioned and/or configurated with a view to permit passage of the heads 43b. If the openings 48 are large, namely enough to permit the heads 43b to pass therethrough, such heads are intercepted by the flange 4e (the openings 46 are then too small to permit the heads 43b to pass).

The clutch plate 4a of the preassembled unit A is accurately centered between the secondary flywheel 3 and the pressure plate 4b in such a way that the axis of its hub 4c coincides with the axes of the output element 75 and input element 85 when the installation of the torque transmitting apparatus 1 between an engine and a variable-speed transmission is completed.

The dimensions and/or the distribution of the openings 46, 48 is preferably selected in such a way that these openings are in at least partial alignment with each other even if the spacing of holes 5 in the circumferential direction of the extension 15 is not entirely uniform. Such non-uniform spacing of the holes 5 will be selected if the primary flywheel 2 is to be connected to the output element 75 of the engine in a single predetermined angular position.

The reference character 68 denotes a liner which is installed between the internal surfaces of the components 10, 11 and the adjacent portions of the energy storing elements 8. The liner 68 can be assembled of several arcuate trough-shaped sections which are contacted by adjacent portions of the energy storing elements 8 when the flywheel 2 is rotated by the engine, i.e., when the energy storing elements 8 are acted upon by centrifugal force. For example, the sections of the liner 68 can be made of a metallic sheet material.

The components 10, 11 constitute that section of the primary flywheel 2 which produces by far the greatest part of the mass moment of inertia. This section is carried by the axially deformable axially stressed membrane 13 which is connected to the output element 75 by the extension 15 and fasteners 43. Thus, the pronounced mass moment of inertia is generated in spite of the fact that a substantial part (as seen in the radial direction of the apparatus 1) of the primary flywheel 2 is constituted by a thin or extremely thin membrane which renders it possible to greatly reduce the axial dimensions of the apparatus 1 by moving the secondary flywheel 2 and the clutch 4 much closer to the engine than in heretofore known torque transmitting apparatus. Thus, the membrane 13 renders it possible to greatly reduce the axial dimensions of that portion of the primary flywheel 2 which is located radially inwardly of the toroidal portion 9a of the chamber 9 which, in turn, renders it possible to locate the secondary flywheel 3 and the cutch 4 in much closer proximity to the output element 75 than in conventional torque transmitting apparatus.

The rivets 14 can be replaced with welded joints or with threaded fasteners without departing from the spirit of the invention. The same applies for the non-illustrated rivets which are used to connect the washer-like member 18 and the retaining washer 19 to the extension 15 and for simultaneously clamping the part 17 of the membrane 13 between the extension and the member 18. Furthermore, and to even further reduce the likelihood of rotation of the extension 15 relative to the membrane 13, the part 17 can be provided with axially extending pockets to receive complementary projections of the member 18 and/or extension 15.

The membrane 13 can be made of resilient metallic sheet material. This enables the membrane to undergo axial and/or other deformation when the apparatus 1 is properly installed between the output element 75 of the engine and the input element 80 of the transmission.

The feature that the radially outer portion 32 of the membrane 13 is nearer to the engine than the radially inner portion 31 is desirable and advantageous because this moves the toroidal portion 9a of the space 9 further to the left and provides additional room for the secondary flywheel 3 and clutch 4 closer to the engine. As can be seen in FIG. 1, the plane of the radially inner portion 31 of the membrane 13 is close to or is located in the plane of the axes of energy storing elements 8 in the toroidal portion 9a of the chamber 9. Thus, the left-hand side of the secondary flywheel 3 can be moved at least close to the radially inner portion 31 of the membrane 13 and hence at least close to the just mentioned plane of the axes of the energy storing elements 8 with attendant reduction of the axial dimension of the assembled torque transmitting apparatus.

When the primary flywheel 2 is properly connected to the output element 75, the heads 43b of the fasteners 43 bear against the adjacent side of the retaining washer 19 to urge the washer 18 against the output element 75.

This results in additional clamping of the radially innermost part 17 of the membrane 13 between the extension 15 and the member 18.

The seal 37 can be said to constitute an additional damper which operates between the flywheels 2, 3 because this seal is non-rotatably mounted in the component 11 of the primary flywheel 2 and is biased (by the axially stressed membrane 13) into frictional engagement with the torque transmitting means 23 which is fixedly connected to the secondary flywheel 3. The membrane 13 is stressed in the axial direction to pull the component 11 and the seal 37 in a direction to the left, i.e., toward the engine.

Figure 2:
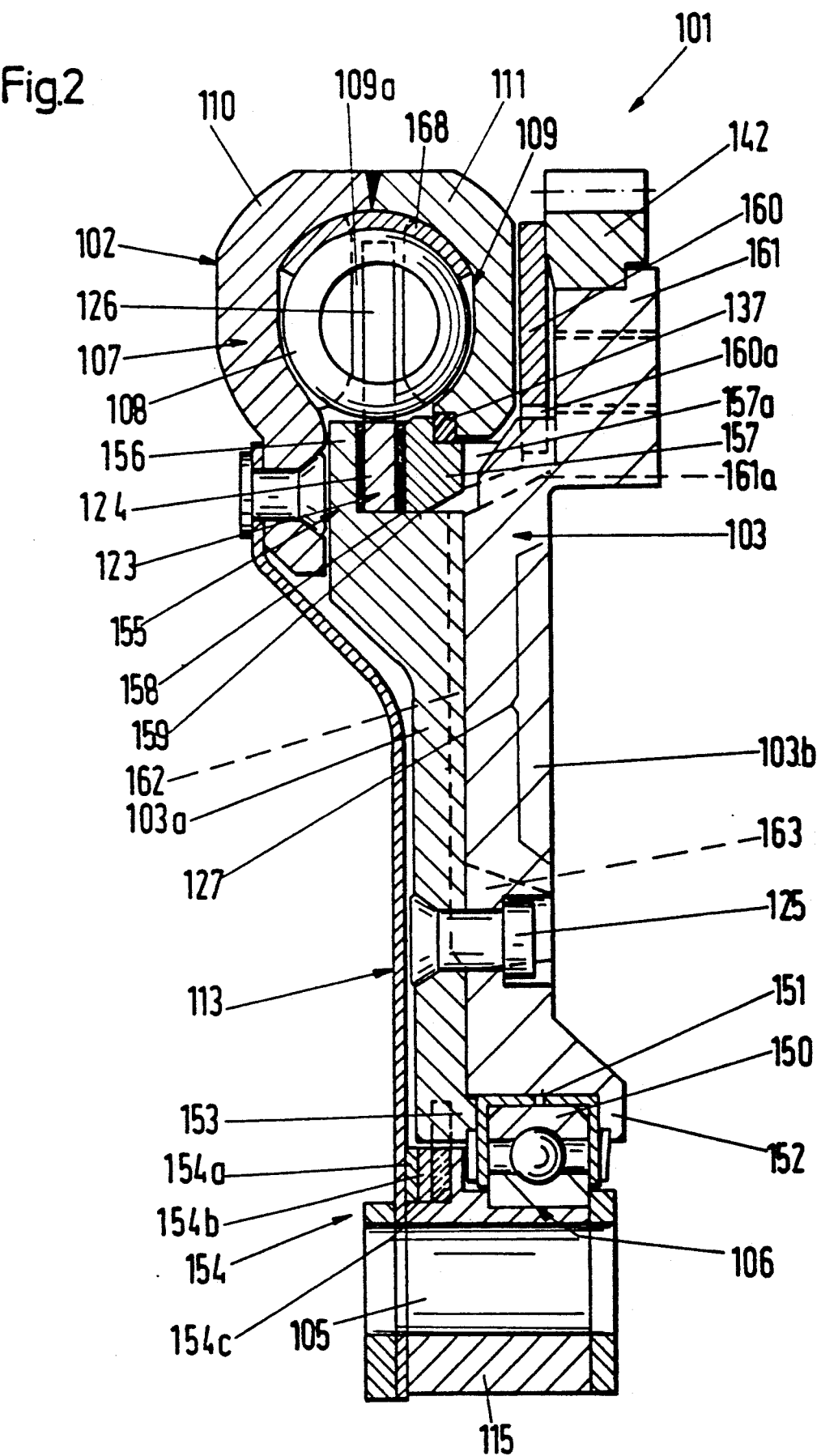
FIG. 2 is a similar fragmentary axial sectional view of a modified apparatus with a slip clutch between the damper and the secondary flywheel.

FIG. 2 shows a portion of a second torque transmitting apparatus 101 which comprises a damper 107 operating between a primary or first flywheel 102 and a second or secondary flywheel 103. The damper 107 comprises an annulus of energy storing elements 108 in the form of arcuate coil springs 108 acting in the circumferential direction of the flywheels 102, 103 and being confined in the toroidal radially outermost portion 109a of an annular chamber 109 defined by the rigid components 110, 111 of the primary flywheel 102. The toroidal portion 109a is divided into several arcuate compartments, one for each coil spring 108, for example, in the same way as described in connection with the apparatus 1 of FIG. 1. The compartments of the toroidal portion 109a are separated from each other by partitions which are formed by depressions of the components 110 and 111.

The radially inner portion of the component 110 is riveted to the outer portion of a dished membrane 113 which is clamped to the left-hand axial end of an extension 115 having holes 105 for fasteners (not shown in FIG. 2) which connect the primary flywheel 102 (including the components 110, 111, the membrane 113 and the extension 115) to the rotary output element (not shown) of an engine. The extension 115 is surrounded by an antifriction roller bearing 106 which is surrounded, by the radially innermost portion of the secondary flywheel 103.

The flywheel 103 comprises two disc-shaped sections 103a, 103b which are disposed side-by-side and are rigidly secured to each other by rivets 125. The outer race 150 of the bearing 106 is received in an internal groove or recess 151 of the right-hand section 103b of the secondary flywheel 103, namely of that section which is provided with an annular friction surface 127. The construction of the friction clutch (not shown in FIG. 2) which can be engaged to transmit torque from the flywheel 103 to the input element of a variable-speed transmission is or can be the same as that of the clutch 4 which is shown in FIG. 1. The outer race 150 is held in the illustrated position (of axial alignment with the section 103b) by a radially inwardly extending shoulder 152 of the section 103b and by a radially inwardly extending shoulder 153 of the section 103a.

A friction generating device 154 is installed between the bearing 106 and the membrane 113 radially outwardly of the extension 115. This friction generating device comprises a diaphragm spring 154a which reacts against the membrane 113 and bears against a pressure applying washer 154b so that the latter biases a friction ring 154c against a radially outwardly extending collar of the extension 115. The radially outer portion of the friction ring 154c has arms which extend into recesses of the section 103a. The friction generating device 154 constitutes an auxiliary damper which opposes rotation of the flywheels 102, 103 relative to each other.

The torque transmitting means 123 between the damper 107 and the section 103a of the secondary flywheel 103 comprises a ring-shaped carrier 124 of radially outwardly projecting arms 126 which extend into the toroidal portion 109a of the chamber 109 to alternate with the coil springs 108 in the circumferential direction of the primary flywheel 102. In accordance with a feature of the invention, the torque transmitting means 123 forms part of a slip clutch 155 which serves as a means for limiting the magnitude of torque that can be transmitted from the damper 107 to the secondary flywheel 103. The slip clutch 155 is closely adjacent and is located radially inwardly of the coil springs 108. The ring-shaped portion or carrier 124 of the torque transmitting means 123 is clamped between a radially outwardly extending flange 156 of the section 103a and a pressure applying ring 157. The latter has projections 157a extending axially of the flywheels 102, 103 and away from the flywheel 102 to be engaged by the radially inwardly extending prongs 160a of a diaphragm spring 160. Friction generating rings 158 are interposed between the ring-shaped carrier 124 of the torque transmitting means 123 on the one hand, and the flange 156 and the pressure applying ring 157 on the other hand.

The torque transmitting means 123 and the pressure applying ring 157 are centered on an axially extending preferably cylindrical shoulder 159 of the section 103b. The annular outer portion of the diaphragm spring 160 reacts against a ring-shaped starter gear 142 which abuts a radially outwardly extending shoulder 161 of the radially outermost portion of the section 103b, and the prongs 160a of the spring 160 are caused to bear against the projections 157a of the pressure applying ring 157 so that the latter is urged axially toward the carrier 124 of the torque transmitting means 123. The carrier 124 is thereby urged against the flange 156 which is inwardly adjacent the radially inner portion of the component 110.

The ring-shaped starter gear 142 need not be axially fixed to the secondary flywheel 103 because it is permanently biased against the shoulder 161 of the section 103b by the prestressed diaphragm spring 160. In fact, the starter gear 142 need not be positively connected for rotation with the section 103b because the required force to rotate the secondary flywheel 103 in response to rotation of the gear 142 by the engine is generated by friction between the gear 142 and the diaphragm spring 160 which is non-rotatably connected with the secondary flywheel. Thus, the starter gear 142 need not be shrunk onto or welded or otherwise positively connected to the section 103b.

The projections 157a of the pressure applying ring 157 and the prongs 160a of the diaphragm spring 160 are equidistant from each other in the circumferential direction of the secondary flywheel 103 and extend into adjacent notches 161a of the section 103b so that they are compelled to share the angular movements of the secondary flywheel 103 and vice versa.

FIG. 2 shows that the torsionally elastic damper 107 and the slip clutch 155 (which is located immediately radially inwardly of the damper 107) are located radially outwardly of the friction surface 127 on the section 103b of the secondary flywheel 103.

The slip clutch 155 performs the additional function of sealing the chamber 109 (which is at least partially filled with a viscous fluid) from the atmosphere. A second seal 137 is analogous to the seal 37 in the apparatus 1 of FIG. 1 and is installed between the radially outer portion of the pressure applying ring 157 and the radially inner portion of the component 111 of toroidal portion of the primary flywheel 102. The seal 137 is a ring which has a polygonal (preferably square) cross-sectional outline and extends into complementary grooves of the pressure applying ring 157 and component 111. The membrane 113 is axially stressed in a manner as described in connection with FIG. 1 in order to urge the component 111 axially toward the pressure applying ring 157 so that the seal 137 is compressed between the parts 111 and 157.

The means for cooling the secondary flywheel 103 comprises radially extending channels 162 which are provided between the sections 103a, 103b and can constitute grooves which are machined into or otherwise formed in the respective surface of one of these sections. FIG. 2 merely shows a single channel 162 but the secondary flywheel 103 is preferably provided with a set of equidistant radially extending channels 162 which receive fresh atmospheric air by way of substantially axially parallel openings 163 provided in the section 103b radially inwardly of the friction surface 127. The openings 163 draw air from the interior of the friction clutch or from the central opening of the friction clutch. The channels 162 discharge heated air streams radially outwardly into the annular space for the diaphragm spring 160 between the flywheels 102 and 103. The openings 163 and/or the channels 162 can be elongated in the circumferential direction of the flywheels. The channels 162 ensure adequate cooling of the flywheel 103 and prevent overheating of the contents of the chamber 109 even though the section 103b of the secondary flywheel 103 is immediately adjacent and bounds a portion of the chamber 109. This is due to the fact that air streams which are caused to flow in the channels 162 and into the space for the diaphragm spring 160 are capable of removing large quantities of heat from the section 103b, i.e., from that section of the secondary flywheel 103 which is provided with the friction surface 127.

An advantage of the apparatus 101 of FIG. 2 is that the slip clutch 155 is remote from the friction surface 127 so that its operation is not subjected to negative thermal influences by the section 103b which generates heat when its friction surface 127 is caused to slide relative to the adjacent friction lining of the clutch plate.

The channels 162 and/or the openings 163 can be configurated and dimensioned in such a way that they act not unlike a thermal barrier to even further reduce the likelihood of overheating of the slip clutch 155 and/or of the contents of the chamber 109. In other words, the width of webs or ribs between the channels 162 and/or between the openings 163 can be selected in such a way that they act not unlike throttles or flow restrictors and limit the quantities of heat which are being transmitted from the section 103b to the section 103a during engagement or disengagement of the friction clutch. This greatly reduces the likelihood of negative thermal influencing of the section 103a when the section 103b is caused to generate substantial amounts of heat.

The radially outermost portion 109a of the chamber 109 contains a liner 168 which shields the components 110, 111 from extensive wear. Thus, worn springs 108 and/or worn sections of the liner 168 can be replaced when necessary but the components 110, 111 are shielded from any wear or at least from extensive wear.

The slip clutch 155 exhibits the advantage that it is capable of damping additional fluctuations of torque which is transmitted from the engine to the primary flywheel 102 in actual use of the torque transmitting apparatus 101. Thus, the rotational speed of the input element of the transmission is more uniform than in the absence of a slip clutch between the damper 107 and the secondary flywheel 103.

The slip clutch 155 can be replaced with a torsionally elastic damper which comprises one or more springs. All that counts is to provide a second damper which complements the damper 107 and contributes to quieter and more predictable operation of the power train which employs the improved torque transmitting apparatus.

Figure 3:
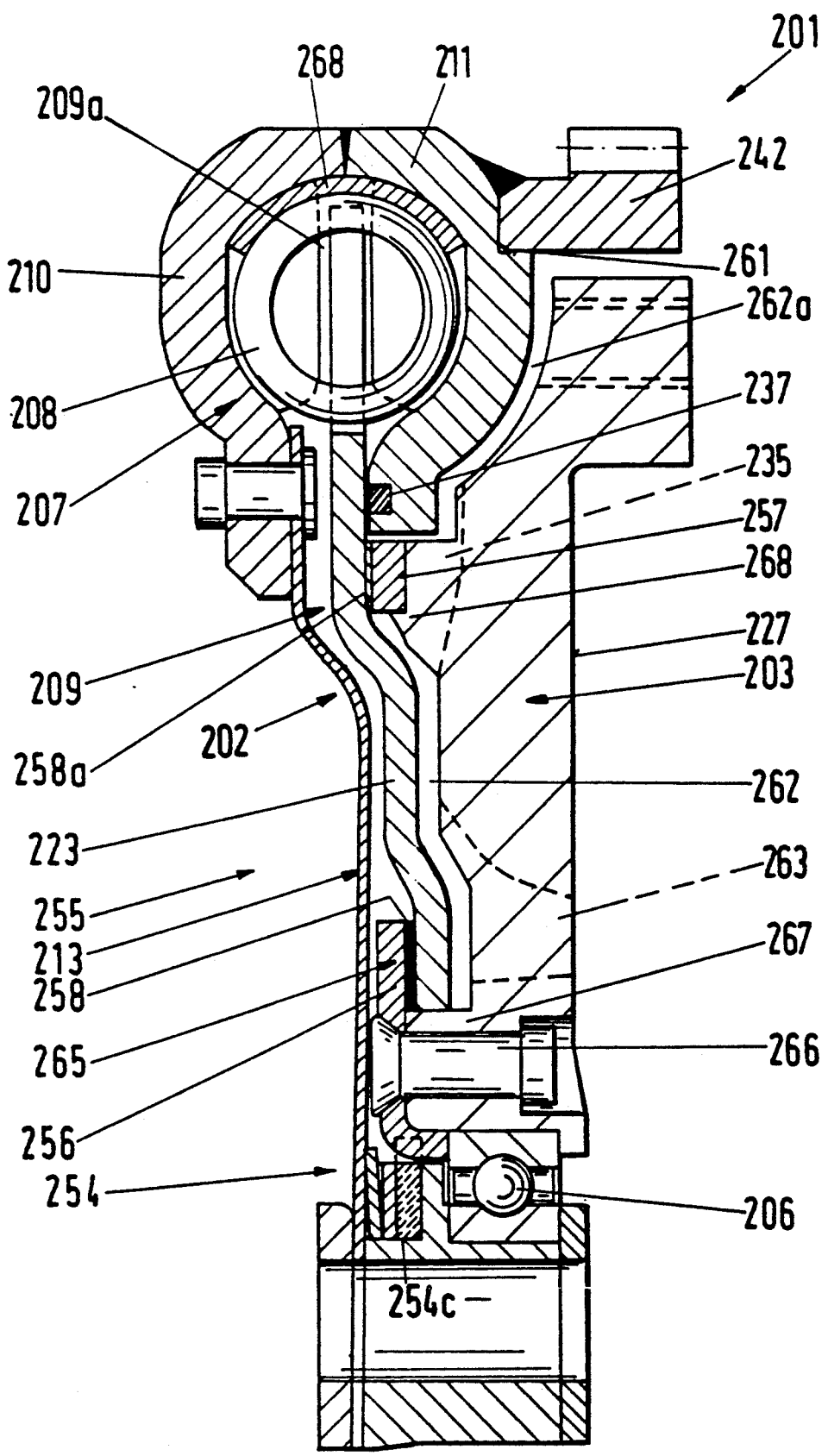
FIG. 3 is a similar fragmentary axial sectional view of a third apparatus.

Referring to FIG. 3, there is shown a torque transmitting apparatus 201 which comprises a primary flywheel 202 with a membrane 213 and components 210, 211 defining a toroidal portion 209a of an annular chamber 209, and a secondary flywheel 203 which can drive a transmission by way of a friction clutch, not shown. The chamber 209 accommodates a damper 207 with circumferentially extending and circumferentially acting energy storing elements in the form of arcuate coil springs 208. A slip clutch 255 is installed radially inwardly of the damper 207. The manner in which the coil springs 208 are installed in the radially outermost toroidal portion 209a of the chamber 209 is or can be the same as described with reference to the apparatus 1 of FIG. 1.

The torque transmitting means 223 constitutes the output element of the damper 207 and the input element of the slip clutch 255. Such torque transmitting means is clamped between two axially spaced apart abutments including a first abutment 257 inwardly adjacent the component 211 and a second abutment 256 located radially inwardly of the abutment 257 adjacent to rivets 266 which indirectly connect the torque transmitting means 223 to the secondary flywheel 203.

The abutment 256 constitutes the radially outer portion of a disc-shaped member 256 which is secured to the flywheel 203 by the aforementioned rivets 266 radially inwardly of the slip clutch 255. The member 256 extends along the left-hand side and along the internal surface of a ring-shaped axially extending protuberance 267 of the flywheel 203. The protuberance 267 further serves to center the torque transmitting means 223 which is preferably made of a suitable resilient material.

A friction ring 258 of the slip clutch 255 is interposed between the torque transmitting means 223 and the abutment 256 on the member 265. The radially outer abutment 257 is a flat washer which abuts the secondary flywheel 203 immediately radially inwardly of the component 211. The abutment 257 surrounds and is centered on a shoulder 268 at the left-hand side of the secondary flywheel 203 and is non-rotatably mounted on the secondary flywheel. To this end, the abutment 257 can be provided with one or more male or female detents which engage complementary female or male detents on the flywheel 203; the male detents of the abutment 257 can extend radially inwardly into complementary female detents or recesses in the shoulder 268. A friction ring 258a is interposed between the abutment 257 and the adjacent side of the torque transmitting means 223.

The apparatus 201 of FIG. 3 also exhibits the advantage that its axial dimensions are but a fraction of corresponding dimensions of a conventional torque transmitting apparatus. This is due to the fact that the membrane 213 is much thinner than the radially extending portion of a conventional primary flywheel and also because the composite flywheel 202+203 is designed to ensure that the central portion of the secondary flywheel can be placed in close or practically immediate proximity to the membrane 213. The aforedescribed design of the slip clutch 255 also contributes to a reduction of axial dimensions of the apparatus 201. This slip clutch contributes insignificantly to the space requirements of the apparatus 201 in the axial direction of the two flywheels.

The chamber 209 is sealed from the atmosphere by a seal 237 which is installed between the torque transmitting means 223 and the component 211. The manner of mounting this seal is or can be identical to that described in connection with the seal 37 in the apparatus 1 of FIG. 1. The chamber 209 is further sealed between the membrane 213 and the torque transmitting means 223, namely in the region of the bearing 206. Thus, the torque transmitting means 223 is in sealing engagement with the abutment 256 via friction ring 258, and the member 265 which includes the abutment 256 is in sealing engagement with the protuberance 267 of the secondary flywheel 203. The bearing 206 prevents escape of viscous fluid radially inwardly of the member 265.

The component 211 of the primary flywheel 202 is relatively small. This component bounds portions of the coil springs 208 in the chamber 209 and carries the ring-shaped starter gear 242 which is secured thereto by a welded joint. The gear 242 is centered on a shoulder 261 of the component 211. Furthermore, the component 211 carries the seal 237 and cooperates with the radially outermost portion of the secondary flywheel 203 to define a passage 262a for escape of spent (heated) air into the atmosphere.

The means for cooling the secondary flywheel 203 and for preventing overheating of the slip clutch 255 and of the contents of the toroidal portion 209a of the chamber 209 includes the aforementioned passage 262a and a radially outwardly extending clearance or gap 262 between the torque transmitting means 223 and the secondary flywheel 203 radially inwardly of the abutment 257. The radially inner portion of the gap 262 receives fresh air from substantially axially parallel openings 263 which are provided in the secondary flywheel 203 radially inwardly of the friction surface 227. The radially outer portion of the gap 262 communicates with the passage 262a by way of radially extending channels 235 which are provided in the secondary flywheel 203 and extend along the abutment 257, i.e., the abutment 257 overlies portions of the channels 235.

The openings 263 cooperate with the gap 262, channels 235 and passage 262a to ensure adequate cooling of the secondary flywheel 203, of the torque transmitting means 223, and of the contents of the toroidal portion 209a of the chamber 209. Thus, the viscous fluid which fills a part of or the entire chamber 209 cannot be overheated during those stages of operation of the friction clutch when the secondary flywheel 203 is caused to generate substantial amounts of heat.

The apparatus 201 further comprises a friction generating device 254 which is analogous to the friction generating device 154 in the apparatus 101 of FIG. 2. The friction ring 254c of the device 254 is rotatable with the secondary flywheel 203 because it is anchored in the member 265. To this end, the friction ring 254c has radially outwardly extending arms which are received in complementary recesses of the member 265.

The membrane 213 can replace the liner 268. Thus, the radially outer portion of the membrane 213 can extend into the chamber 209 to overlie the internal surfaces of the components 210, 211 at locations where these components follow the outlines of adjacent portions of the coil springs 208. In other words, the liner 268 can be made an integral part of the membrane 213.

Figure 4:
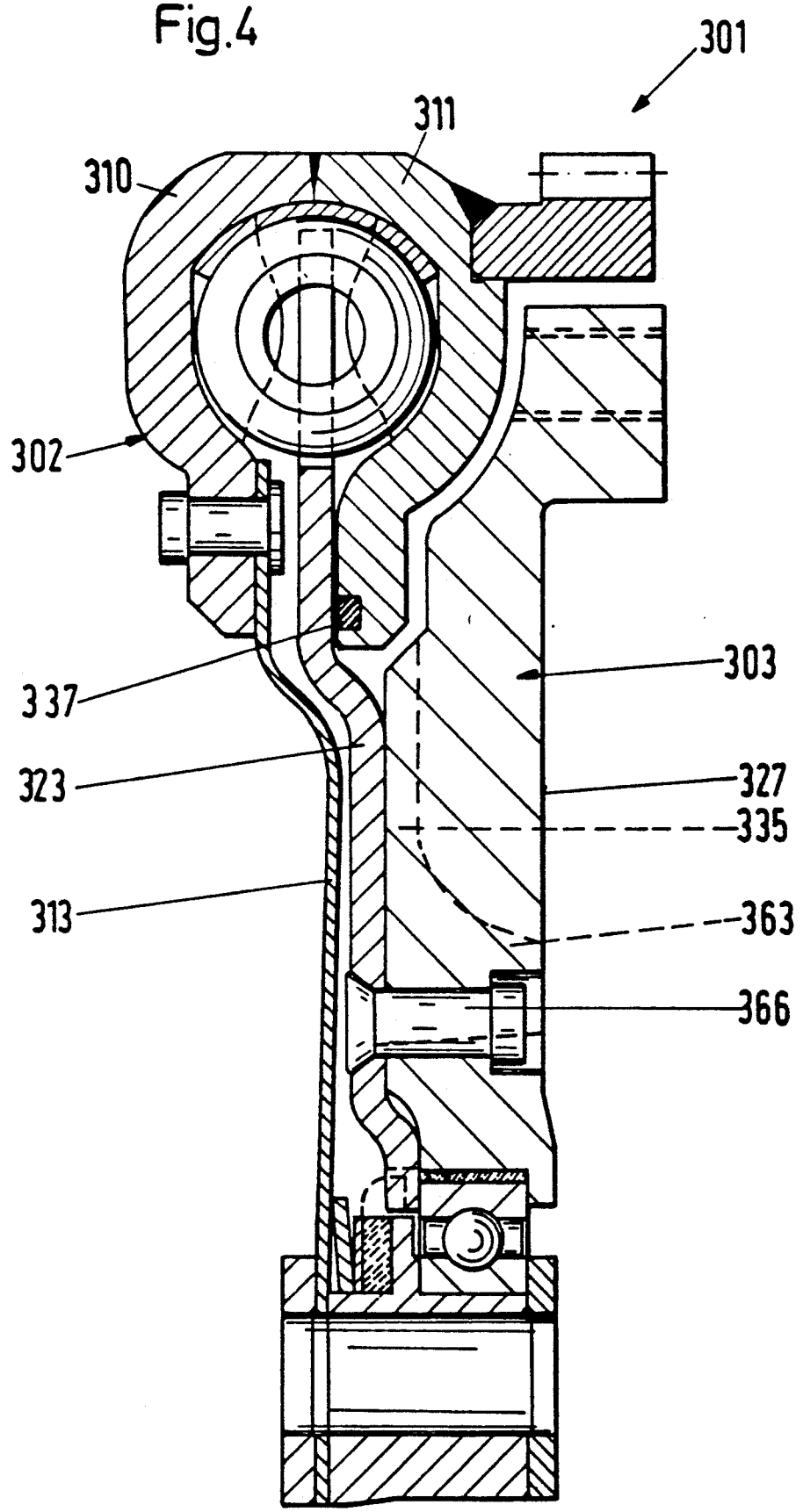
FIG. 4 is a similar fragmentary axial sectional view of a fourth apparatus.

The torque transmitting apparatus 301 of FIG. 4 differs from the apparatus 201 of FIG. 3 in that its torque transmitting means 323 is riveted (at 366) to the secondary flywheel 303 radially inwardly of the friction surface 327. The flywheel 303 has substantially axially extending openings 363 which admit air into radially outwardly extending channels 335 in the left-hand side of the secondary flywheel adjacent the intermediate portion of the torque transmitting means 323. The torque transmitting means 323 can be said to constitute a cover or lid which compels air streams to flow from the openings 363, through the channels 335 and into the passage or space between the radially outermost portion of the secondary flywheel 303 and the component 311 of the toroidal portion of the primary flywheel 302. The latter is analogous to the primary flywheel 2 of the apparatus 1 in FIG. 1, and its membrane 313 serves to mount the components 310, 311 on the output element of the engine.

The membrane 313 is installed in axially stressed condition, the same as the membrane 213. This ensures that the seals 237, 337 are properly compressed by being biased (by 211, 311) against the torque transmitting means 223, 323, respectively.

An important advantage of the improved torque transmitting apparatus is that the apparatus can perform movements in the axial direction of the output element of the engine and can also be tilted relative to the axis of the output element. The membrane 13, 113, 213 or 313 tends to return the apparatus to the normal position in which the flywheels are coaxial with the output element of the engine. The membrane (such as 13) ensures that the flywheels must share the angular movements of the output element of the engine but this membrane permits many other movements of the flywheels including axially of the output element. The membrane is sufficiently thin to yield in the axial direction as well as to permit tilting of the flywheels but is installed in such condition that the primary flywheel must rotate with the output element of the engine. As a rule, the axial and/or other stray movements of the flywheels are small or extremely small; however, the possibility for such movements exists with attendant advantages concerning the accuracy of finish and assembly of the component parts of the apparatus. All axial and/or other stray movements take place against the resistance of the membrane which tends to maintain the composite flywheel in a predetermined axial position as well as in exact axial alignment with the output element of the engine. Furthermore, the just outlined mounting of the membrane renders it possible to ensure that the flywheels need not share eventual axial and/or tilting and/or other stray movements of the input element of the transmission and/or of the output element of the engine.

The improved apparatus is susceptible of many additional modifications. For example, the features of the torque transmitting apparatus 1 of FIG. 1 can be combined with those of the apparatus 101, 201 and/or 301; the features of the apparatus 101 can be combined with those of the apparatus 201 and/or 301, etc. Furthermore, the damper which is installed in the toroidal portion of the annular chamber can employ two or more annuli of energy storing elements which operate in parallel or in series, and the friction clutch 4 can be replaced by any other suitable clutch which is capable of being engaged and disengaged to thereby transmit or cease to transmit torque between the secondary flywheel and the input element of a variable-speed transmission.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for transmitting torque in a motor vehicle, comprising a first flywheel rotatable about a predetermined axis and including a membrane having a first portion adjacent said axis and connectable with a rotary output element of an engine in the vehicle, said first flywheel further including a toroidal portion defining an annular chamber spaced apart from and surrounding said axis, said membrane further having a second portion surrounding said first portion and connected with said toroidal portion; a second flywheel coaxial with and rotatable relative to said first flywheel and connectable with an input element of a transmission in the vehicle by a clutch; at least one antifriction bearing between said flywheels; and at least one damper operative to oppose rotation of said flywheels relative to each other and having energy storing elements installed in said chamber and acting in the circumferential direction of said flywheels.

2. The apparatus of claim 1, wherein said toroidal portion includes two substantially bowl-shaped components.

3. The apparatus of claim 2, wherein one of said components is adjacent the engine when said first flywheel is connected to the output element of the engine, said second portion of said membrane being fixedly connected with said one component.

4. The apparatus of claim 1, wherein said first portion of said membrane is offset relative to said second portion in the axial direction of said first flywheel.

5. The apparatus of claim 4, wherein said portions of said membrane are disk-shaped portions and said second portion is nearer to the engine than said first portion when said first portion is connected with the output element of the engine.

6. The apparatus of claim 1, wherein said first flywheel further comprises an axial extension at said first portion of said membrane, said at least one bearing being disposed between said extension and said second flywheel.

7. The apparatus of claim 6, further comprising a washer adjacent said extension, said first portion of said membrane being clamped between said washer and said extension.

8. The apparatus of claim 6, wherein said membrane has a side facing said second flywheel and said extension is disposed at said side of said membrane.

9. The apparatus of claim 1, further comprising means for transmitting torque between said at least one damper and said second flywheel, said torque transmitting means comprising portions supported by said second flywheel and extending into said chamber between said energy storing elements.

10. The apparatus of claim 9, further comprising means for fixedly securing said portions of said torque transmitting means to said second flywheel.

11. The apparatus of claim 9, further comprising a second damper interposed between said torque transmitting means and said second flywheel.

12. The apparatus of claim 11, wherein said second damper comprises a slip clutch.

13. The apparatus of claim 11, wherein said second damper is a torsionally elastic damper and comprises at least one spring.

14. The apparatus of claim 9, further comprising means for limiting the magnitude of torque which can be transmitted by said torque transmitting means, said limiting means comprising a slip clutch disposed close to and radially inwardly of said energy storing elements.

15. The apparatus of claim 14, wherein said second flywheel has an annular friction surface adjacent a clutch plate of said clutch, said slip clutch being disposed radially outwardly of said friction surface.

16. The apparatus of claim 9, further comprising a second damper interposed between said membrane and said second flywheel.

17. The apparatus of claim 1, further comprising a seal which is interposed between said flywheels and is biased by said membrane.

18. The apparatus of claim 1, wherein said membrane is stressed in the axial direction of said first flywheel and is maintained in at least indirect frictional engagement with said second flywheel.

19. The apparatus of claim 1, wherein said membrane is elastic and stresses said second flywheel in the direction of said axis.

20. The apparatus of claim 1, wherein at least one bearing has means for taking up the axial stress of said membrane.

21. Apparatus for transmitting torque in a motor vehicle, comprising a first rotary flywheel connectable with an engine of the motor vehicle; a second flywheel coaxial with and rotatable relative to said first flywheel and connectable with a transmission in the vehicle; at least one damper operative to oppose rotation of said flywheels relative to each other and including energy storing elements acting in the circumferential direction of said flywheels; means for transmitting torque from said at least one damper to said second flywheel; and means for limiting the magnitude of torque which is transmitted by said torque transmitting means, including a slip clutch adjacent to and disposed radially inwardly of and in series with said energy storing elements.

* * * * *